United States Patent [19]

Seegmiller

[11] Patent Number: 4,648,267

[45] Date of Patent: Mar. 10, 1987

[54] LIQUID SEEDING ATOMIZER

[75] Inventor: Henry L. B. Seegmiller, Los Gatos, Calif.

[73] Assignee: The United States Government as represented by the Administrator of the National Aeronautics and Space Administration, Washington, D.C.

[21] Appl. No.: 846,428

[22] Filed: Mar. 31, 1986

[51] Int. Cl.⁴ .......................... B05B 7/04; G01M 9/00

[52] U.S. Cl. ...................................... 73/147; 239/426; 239/434; 239/545

[58] Field of Search .................. 73/147; 239/545, 434, 239/426

[56] References Cited

U.S. PATENT DOCUMENTS

| | | | |
|---|---|---|---|
| 2,515,069 | 7/1950 | Zola | 73/147 |
| 3,606,159 | 9/1971 | Sutton | 239/426 |
| 3,774,842 | 11/1973 | Howell | 239/25 |
| 3,896,666 | 7/1975 | Johnson et al. | 73/147 |
| 4,221,339 | 9/1980 | Yoshikawa | 239/704 |

FOREIGN PATENT DOCUMENTS

| | | | |
|---|---|---|---|
| 0588815 | 2/1925 | France | 239/545 |
| 0650618 | 12/1961 | Italy | 239/545 |

*Primary Examiner*—Donald O. Woodiel

*Attorney, Agent, or Firm*—Darrell G. Brekke; John R. Manning; Robert D. Marchant

[57] ABSTRACT

An atomizer (10) for a liquid has an air supply tube (20). Liquid supply tubes (26, 28) extend longitudinally along the air supply tube (20). The air supply tube (b 20) has at least one air orifice (22) extending from an inner surface (24) of the tube (20) through the tube. The liquid supply tubes (26, 28) are positioned on either side of the air orifices (22) and the liquid tubes are sealed to the air supply tube. The liquid supply tubes (26, 28) with facing liquid orifices (30) are positioned adjacent each of the air orifices 22. The liquid supply tubes (26, 28) are laterally spaced apart at the liquid orifices (30) a distance less than the diameter of the air orifices (22) to enable a beneficial venturi effect when the atomizer is in operation.

14 Claims, 5 Drawing Figures

LIQUID SEEDING ATOMIZER

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

This invention relates to an improved atomizer for providing very small, uniformly-sized liquid particles. More particularly, it relates to such an atomizer especially adapted for providing such liquid particles in a wind tunnel for the purpose of seeding air flow in the wind tunnel for laser Doppler velocimetry.

2. Description of the Prior Art

A variety of atomizers for providing a stream of finely divided liquid particles are known in the art. For example, such liquid atomizers are disclosed in the following issued patents: U.S. Pat. No. 536,216, issued Mar. 26, 1895 to Luther et al.; U.S. Pat. No. 3,774,842, issued Nov. 27, 1973 to Howell and U.S. Pat. No. 4,221,339, issued Sept. 9, 1980 to Yoshikawa.

It is conventional practice for analyzing airflow patterns around airfoils and other structures in wind tunnels to utilize small particles dispersed in the airflow to scatter light to make the flow patterns visible. The scattered light is measured with sophisticated instruments, such as a laser Doppler velocimeter (LDV), to analyze the flow patterns. An example of such an LDV instrument is disclosed in U.S. Pat. No. 3,915,572 issued Oct. 28, 1975 to Orloff. Inaccurate LDV measurements are obtained when the particles are non-uniform in size and when they fail to move in synchronism with the airflow. Attempts to utilize commercially available atomizing nozzles for producing the small particles from a liquid have produced unsatisfactory results. The atomized mist obtained with such commercially available nozzles contains large droplets, and the spatial distribution obtained with such nozzles causes the deposition of particles on windows in the wind tunnel used for the LDV observations. If the droplets are seeded with solid particles and the droplets are too large, the liquid will fail to evaporate before the particles reach the test section. Evaporation failure can permit the existence or growth of droplets with more than one solid particle therein. These enlarged droplets will produce a false measurement when illuminated by the laser beam of a LDV. Further, it is conventional practice in wind tunnel construction to provide porous metal suction panels on the sides of the wind tunnel to thin sidewall boundary layers to reduce airfoil interference effects. If the atomized mist is allowed to reach these porous panels, the panels will become clogged and will require removal for cleaning. Such commercial atomizer nozzles are also too large for insertion through a limited access port of a wind tunnel inlet. A need therefore still remains for a liquid seeding atomizer particularly suited for the wind tunnel environment.

SUMMARY OF THE INVENTION

Accordingly, it is an object of this invention to provide an atomizer for a liquid which will produce small uniformly sized particles in an aerosol spray and which will give a spatial distribution of the aerosol spray which will not obscure observation windows or clog porous sidewall panels in a wind tunnel.

It is another object of the invention to provide such a liquid atomizer which can be inserted through a limited access port at an inlet to the wind tunnel.

It is a further object of the invention to provide such an atomizer for a liquid that will provide the uniform particle size aerosol spray in a wind tunnel and which will not produce a flow disturbance at a point in the wind tunnel where observations of air flow are made.

It is still another object of the invention to provide such an atomizer that can easily be cleaned without removal from the wind tunnel.

It is a still further object of the invention to provide such an atomizer mounted in a wind tunnel in a manner that permits thermal strain relief at different temperatures encountered by the atomizer in operation of the wind tunnel.

The attainment of these and related objects may be achieved through use of an atomizer comprising three tubes, two of which carry liquid and one which carries air. The air supply tube has one or more orifices longitudinally spaced for allowing the release of air. The liquid supply tubes each have a similar number of orifices spaced to correspond with those in the air supply tube. The liquid supply tubes are positioned next to air supply tubes on opposite sides of the orifice(s) so that each orifice on the air supply tube is located between facing liquid supply tube orifices. The facing liquid orifices are laterally spaced apart a distance less than the diameter of the corresponding air orifice. When the atomizer is utilized in a wind tunnel for LDV measurements, a liquid seeding material comprising a dispersion of very small uniformly sized solid spheres in an evaporative medium such as alcohol is ejected from the orifices of the liquid supply tubes. The liquid supply tubes are joined together so that a cleaning fluid may be serially flushed through them when desired. One end of the air supply tube encircles a pin and slidably engages it during thermal changes in the materials.

When a liquid atomizer in accordance with the invention is disposed in a wind tunnel, air supplied through the air orifices will cause the ejection of uniform size liquid droplets from the liquid supply tube orifices in a fan-shaped dispersion pattern that does not touch the walls of the wind tunnel. As a result, LDV and other measurements are not affected by deposit of the aerosol spray on viewing windows. Because the spray does not reach the porous boundary layer reduction panels on the sides of the wind tunnel, plugging of these panels from the spray does not occur.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
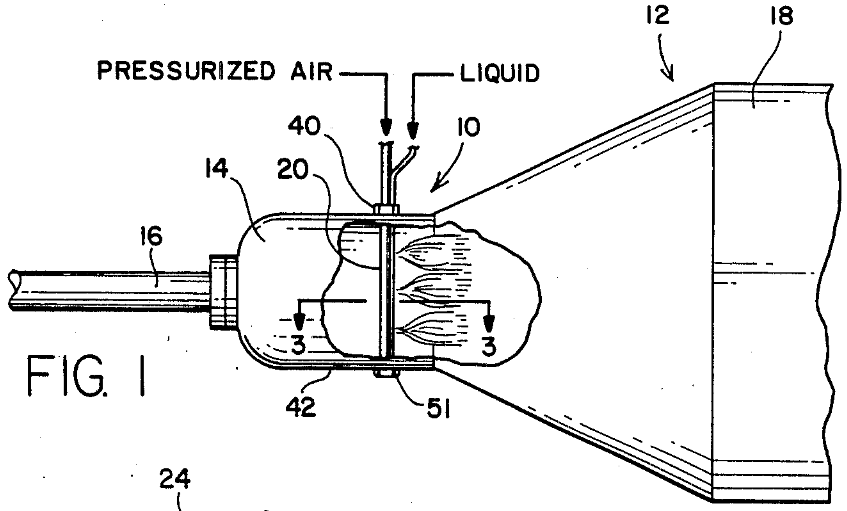
FIG. 1 is a side view of a wind tunnel including an atomizer in accordance with the invention, with a cutaway to show interior detail.

Turning now to the drawings, more particularly to FIG. 1, there is shown an atomizer 10 in accordance with the invention, installed in a wind tunnel 12. The atomizer 10 is situated at air inlet 14 of the wind tunnel 12, between air supply tube 16 and settling chamber 18. Other than the provision of the atomizer 10, the wind tunnel 12 is of conventional construction and will therefore not be described further.

Figure 2:
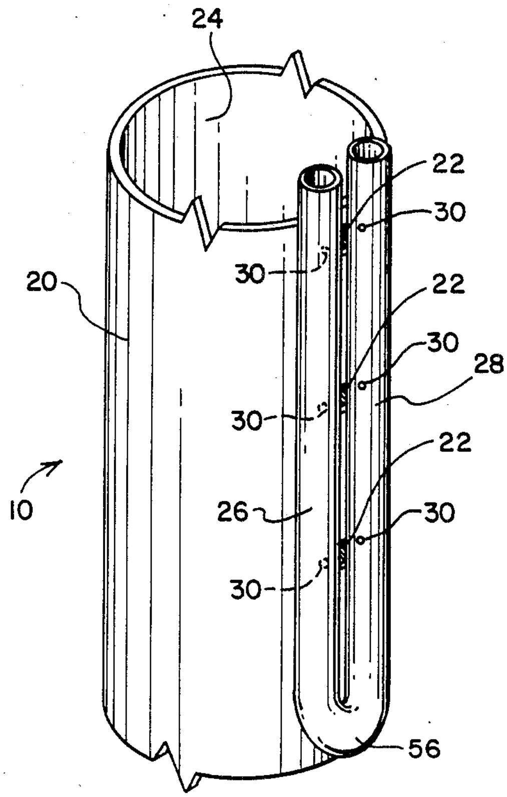
FIG. 2 is an enlarged perspective view of a portion of the atomizer shown in FIG. 1.

FIG. 2 shows the construction of the atomizer 10. Air supply tube 20 is formed from one inch diameter stainless steel tubing. As shown in FIG. 1, the air supply tube 20 is mounted vertically and centered with respect to the sides of the wind tunnel 12. Air supply tube 20 has a plurality of air orifices 22 extending from inner surface 24 through the tube 20, arranged in a line and positioned on the tube 20 facing away from the air inlet tube 16 of the wind tunnel 12 (see also FIG. 1). Liquid feed tubes 26 and 28 are approximately coextensive with air supply tube 20 and they are positioned next to tube 20 on opposite sides of air orifices 22. The tubes 26 and 28 have orifices 30 for permitting the emission of liquid. Each air orifice 22 has facing liquid orifices 30 located adjacent thereto.

In order to prevent distortion of the fluid jets and the resulting formation of large droplets, tubes 26, 28 are sealed along their length to tube 20. In practice, the sealing is accomplished by using silver solder to attach the liquid feed tubes 26 and 28 to the air supply tube 20 and RTV sealing compound to complete the seal.

Figure 3:
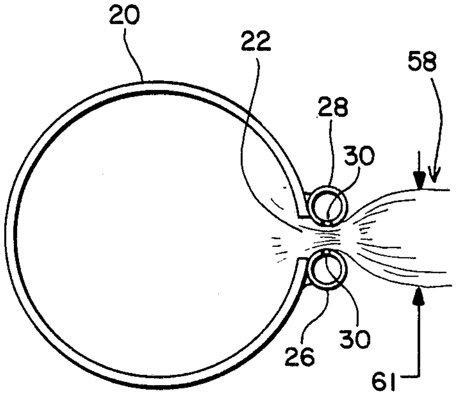
FIG. 3 is a cross-section view taken along the line 3—3 in FIG. 1.

As is best shown in FIG. 3, the liquid feed tubes 26 and 28 are positioned on the air supply tube 20 so that the liquid feed tubes 26 and 28 are spaced apart at liquid orifices 30 less than the diameter of the air orifices 22. This causes a beneficial venturi effect to occur. In practice, a spacing between the tubes 26 and 28 at the orifices 30 of about 70% of the diameter of air orifice 22 is preferred, with an air orifice diameter of 0.180 inch. The liquid tubes 26 and 28 are formed from 0.25 inch stainless steel tubing and the liquid orifices 30 have a diameter of 0.015 inch.

Figure 4:
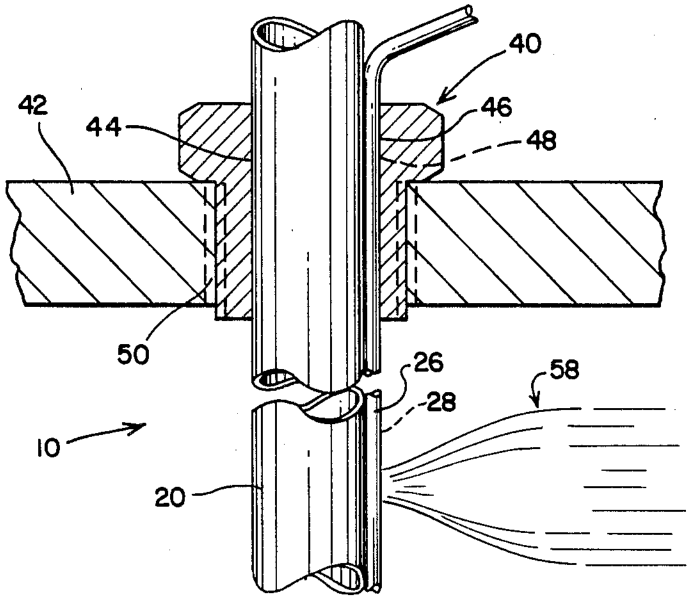
FIG. 4 is an enlarged cross-section view of a portion of the atomizer and wind tunnel combination shown in FIG. 1.

FIG. 4 shows details of fitting 40 attaching the atomizer 10 to wall 42 of the wind tunnel inlet 14 (see also FIG. 1). The air supply tube 20 and the liquid feed tubes 26 and 28 pass through corresponding bores 44, 46 and 48 through the plug 40. Plug 40 is attached in sealing engagement with wall 42 by mating threads 50.

Figure 5:
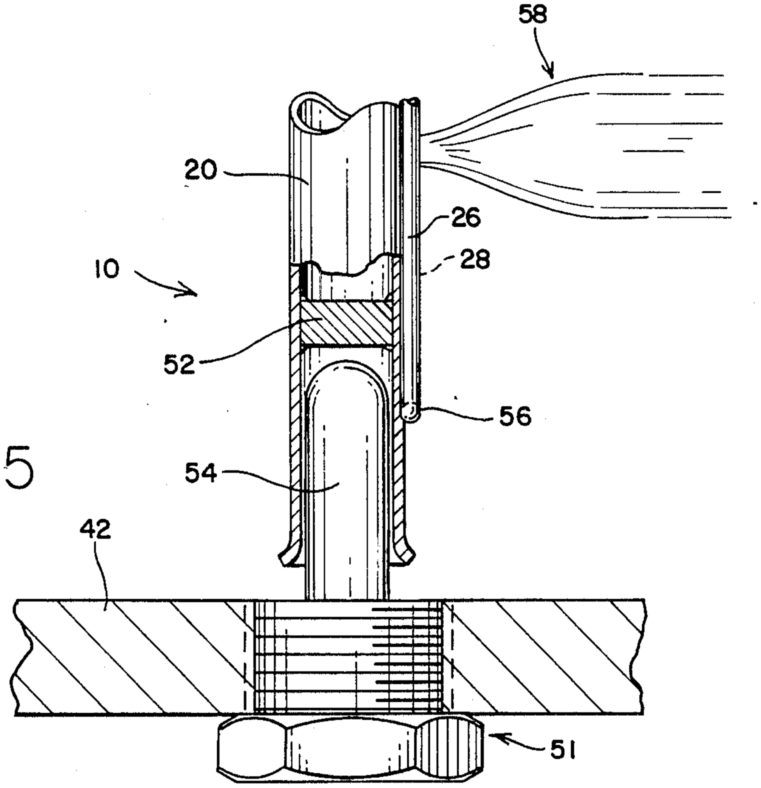
FIG. 5 is another enlarged cross-section view of another portion of the atomizer and wind tunnel combination shown in FIG. 1.

FIG. 5 shows how the air supply tube 20 is attached at the lower wall 42 of air inlet 14 of the wind tunnel 12. The air supply is sealed at its bottom by plug 52. Plug 51 is threadably sealed in wall 42. Pin portion 54 of plug 51 extends upward from the wall 42 and is nearly covered by the portion of tube 20 below baffle 52. Tube 20 is not fixedly attached to pin 54, so the tube is free to move to and fro along pin 54 as a result of thermal expansion and contraction due to temperature changes during operation of the wind tunnel 12.

Tubes 26 and 28 may each be terminated by a baffle (not shown) below the lowest orifice 30; however, it is preferred that tubes 26 and 28 be joined at 56. Thus, a single U-shaped piece of stainless steel tubing may be used to fabricate tubes 26, 28. This permits a cleaning fluid to be circulated through tubes 26 and 28 and the cleaning may be accomplished without having to remove the atomizer 10 from the wind tunnel 12.

In practice, an air pressure of about 400 psi is employed in the air supply tube 20. A liquid seeding material comprised of small uniformly sized solids suspended in a readily evaporative liquid is dispensed through the liquid supply tube orifices 30 when the atomizer is used for LDV applications. The preferred liquid seeding medium is a dispersion of ½ micron diameter polystyrene latex spheres (Dow Plastic Pigment 722, obtainable from The Dow Chemical Company, Midland, Mich.) in alcohol wherein the spheres represent about 0.2% of the weight. Water may be substituted in place of some of the alcohol.

As is best shown in FIGS. 4 and 5, discharge of air through air orifices 22 atomizes the liquid discharged through the liquid orifices 30 to form fan-shaped spray 58, consisting of small uniformly sized droplets. The thickness 61 of fan-shaped spray 58 (FIG. 3) is relatively narrow and this prevents deposition of droplets on the observation windows and the porous boundary layer reduction panels on the sides of the wind tunnel 12. When the aforementioned seeding medium is dispensed from the atomizer 10, the liquid in the small uniformly sized droplets is evaporated by the time the "droplets" reach the test section of the wind tunnel. Thus, the seeding material reaching the test section of the wind tunnel simply consists of dry polystyrene latex spheres which are free to follow the air flow about the test model in the test section. The atomizer 10 is suitable for use in both supersonic and transonic wind tunnels. No disturbance of the air flow in the test section of either type of wind tunnel is observed with use of the atomizer 10. The thickness 61 (FIG. 3) of the fan-shaped spray 58 (the depth of the fan when it is viewed from the side as in FIGS. 4 and 5) may be altered by changing the spacing between tubes 26 and 28 and also by varying the air pressure and air orifice size. In operation the sprays 58 consolidate to generally form one large fan-shaped spray. The width of that large spray (the vertical dimension in FIGS. 1, 4 and 5) is a direct function of the number of orifice groups employed in atomizer 10. When the atomizer is used in a wind tunnel for LDV measurements, the size of the spray pattern may be tailored to the size of the model in the test section. That is, if the model in the test section only occupies a small portion of the test section, one or two orifice groups may be enough to envelope the test model with particles, etc. Likewise, the placement of the orifice groups along the length of tubes 20, 26 and 28 may be influenced by the site of the test model in the test section as well as the shape of the model. Although the atomizer has been shown in FIG. 1 to be installed vertically in the wind tunnel it is to be understood that the atomizer could just as well be installed horizontally. In such an arrangement the fan pattern would be horizontal rather than vertical. Such an arrangement would be useful, for example, for a flat plate model installed horizontally in the test section.

It should now be readily apparent to those skilled in the art that an atomizer and atomizer-wind tunnel combination capable of achieving the stated objects of the invention has been provided. The atomizer provides uniform droplet size in a spray pattern configured to avoid deposition on wind tunnel windows and boundary layer reduction panels in the wind tunnel. The configuration of the atomizer allows its installation through a small access port at a wind tunnel inlet.

It should further be apparent to those skilled in the art that various changes in form and details of the invention as shown and described may be made. For example, the tube 20 could have an elliptical cross-sectional shape instead of a circular one as depicted in the drawings. It is intended that such changes be included within the spirit and scope of the claims appended hereto.

What is claimed is:

1. A liquid atomizer for dispensing small uniform droplets comprising an air supply tube, first and second liquid supply tubes extending longitudinally along said air supply tube, said air supply tube having at least one air orifice, said liquid supply tubes being positioned on opposite sides of the at least one air orifice against said air supply tube, each liquid supply tube having the same number of liquid orifices as the air supply tube has air orifices, each liquid orifice in said first liquid supply tube facing a corresponding liquid orifice in said second liquid supply tube, each facing set of liquid orifices being positioned in front of an air orifice, and each set being spaced apart less than the lateral dimension of the adjacent air orifice associated therewith.

2. The atomizer of claim 1 in which said air supply tube has a plurality of the air orifices spaced longitudinally along said air supply tube and there is a set of facing liquid orifices positioned in front of each of the air orifices.

3. The atomizer of claim 2 in which said liquid supply tubes are formed from a single, generally U-shaped tube.

4. The atomizer of claim 1 in which said liquid supply tubes are sealed against said air supply tube.

5. The atomizer of claim 1 wherein said liquid supply tubes have a smaller circumference than the circumference of said air supply tube and said liquid orifices are smaller than said at least one air orifice.

6. In combination, the atomizer of claim 1 and a wind tunnel having at least an input section and a test section, said atomizer being positioned in the air inlet section of said wind tunnel with the at least one air orifice facing downstream in said wind tunnel whereby droplets from said atomizer are carried from the atomizer toward the test section.

7. The combination of claim 6 in which said wind tunnel section has first and second opposite walls and said atomizer is fixedly attached to said first wall and movably attached to said second wall.

8. An atomizer for dispensing small uniform liquid droplets comprising an air supply tube having a plurality of air emitting orifices spaced longitudinally, first and second liquid supply tubes extending longitudinally along said air supply tubes, each liquid supply tube having liquid emitting orifices corresponding in number and longitudinal spacing to those in said air supply tube, said liquid supply tubes being located on opposite sides of said air orifices with each liquid orifice in said first liquid supply tube facing a corresponding liquid orifice in said second liquid supply tube, each set of facing liquid orifices being positioned in front of an air orifice and the spacing between each facing liquid orifices being less than the lateral dimension of the air orifice associated therewith.

9. The atomizer of claim 8 in which said liquid supply tubes are formed from a single, generally U-shaped tube.

10. The atomizer of claim 8 in which said liquid supply tubes are sealed against said air supply tube.

11. The atomizer of claim 8 wherein said air supply tube has a larger circumference than said liquid supply tubes.

12. In combination, the atomizer of claim 8 and a wind tunnel having at least an inlet section and a test section, said atomizer being positioned in said air inlet section with the air and liquid orifices oriented downstream in the direction of said test section.

13. The combination of claim 12 wherein said atomizer has a first end fixedly attached to a wall of the air inlet section and a second end movably attached to an opposing wall with means for compensating for temperature variations.

14. The combination of claim 13 wherein said compensating means comprises a plug sealed in said opposing wall, said plug has a pin portion that penetrates one end of said air supply tube, and a baffle blocks said air supply tube adjacent one extremity of said pin portion.

* * * * *